Figure 1:
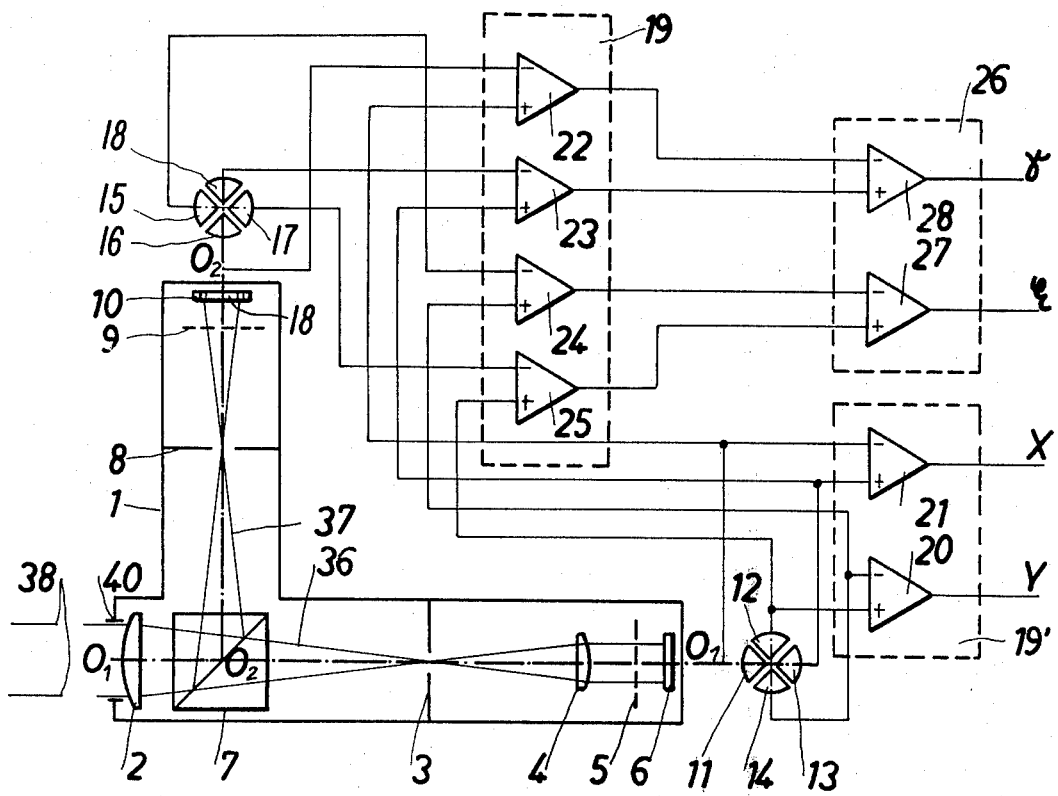

United States Patent [19]

Krieg

[11] 4,277,169

[45] Jul. 7, 1981

[54] DEVICE FOR SIMULTANEOUSLY PERFORMING ALIGNMENT AND SIGHTING OPERATIONS

[76] Inventor: Werner Krieg, 14, Strasse der Kosmonauten, Jena, District of Gera, German Democratic Rep.

[21] Appl. No.: 960,716

[22] Filed: Nov. 27, 1978

[30] Foreign Application Priority Data

Nov. 24, 1977 [DD] German Democratic Rep. ... 202225

[51] Int. Cl.³ .............................................. G01B 11/26
[52] U.S. Cl. ..................... 356/152; 356/141
[58] Field of Search ................................ 356/141, 152

[56] References Cited

U.S. PATENT DOCUMENTS

| | | | |
|---|---|---|---|
| 3,207,904 | 9/1965 | Heinz | 250/202 |
| 3,972,621 | 8/1976 | Eisenkopf | 356/152 |

Primary Examiner—Stephen C. Buczinski

[57] ABSTRACT

The invention concerns a device for simultaneously performing alignment and sighting operations relative to an adjusted vanishing line, and includes a light source, a bundle of parallel light, which is split into two partial light beams. Two identically constructed photo-electric transducer units are arranged one in each of the partial light beams. A subsequent electronic evaluation logic is connected to the photocells of said photoelectric transducer unit for evaluation of deviations from a desired aligned and sighting state. To this purpose identically located photocells in the two photoelectric transducer units are electrically connected to first difference amplifiers and diametrally opposed photocells in each photoelectric transducer unit are connected to first difference amplifiers followed by third difference amplifiers and to second difference amplifiers, respectively.

2 Claims, 2 Drawing Figures

DEVICE FOR SIMULTANEOUSLY PERFORMING ALIGNMENT AND SIGHTING OPERATIONS

This invention concerns a device for simultaneously performing alignment and sighting operations in which respective deviations from an adjusted measuring axis produce electric analog signals.

The alignment and sighting device includes a light source which emits a bundle of parallel light. The operation range and the application of the device strongly depend on the power of this light source. There is a number of measuring devices known which satisfy both, sighting and alignment measurements.

The DL-WP patent specification No. 18222 discloses a conventional alignment and sighting device which, however, permits only subsequent performance of the two operations concerned. The measuring head comprises a telescope, an eyepiece and a graduated dial arranged in the backfocal plane of the objective. A reflector, provided with a cross-wire, is attached to the measuring head. For alignments the objective is so adjusted that the reflector is arranged in the object plane of the former.

The cross-wire of the reflector is imaged into the image plane of the objective to appear on the graduated scale. Any departure from coincidence of the two markings is recognised as misalignment by means of the eyepiece and can be evaluated as desired. The same optical arrangement is used for sighting operations with the only difference of the objective being focused for infinity. A line mark is imaged into the path of rays of the telescope and, after reflection at the reflector of the object the line mark is again imaged on to the graduated plate. Any tilting of the reflector involves a deviation from coincidence between the two marks and can be measured as a departure from a definite direction. Such an autocollimation principle is also disclosed in the U.S. Pat. No. 416,556.

The measuring unit is similar in its construction to the aforementioned one and the objective can be focused as desired on to the reflection system of the object to be measured or at infinity. The reflection system is of particular construction with that invention. It comprises an objective, an eyepiece and two reflectors. Such a double reflector system permits the production of two superimposed graduated line images already in the reflection system. The imaging and the evaluation is carried out in the measuring head in conventional manner.

Both measuring devices are disadvantageous for the following reasons. The alignment and the sighting can only be performed in sequence and the focal length of the objective has to be changed from one kind of measuring to the other.

Furthermore, the respective distance between the object to be measured and the measuring head has to be considered when the system ist focused.

There are also known alignment and sighting devices which permit a simultaneous operation.

In the patent specifications DL No. 86508 and GB No. 841165 this is achieved by use of two objectives. One of the objectives is focused on to the reflector or to a crosswire and in the measuring head the departures from the optical axis of the objective are obtained by comparison to a non-displaceable graduation. The other objective serves to control the parallel path of rays. The images of the graduation lines to be evaluated are arranged in the same image plane above or beside one another. Both measuring systems are disadvantageous for their complicated construction because the principle of the conventional aligning and sighting is adhered to. With the exception of a simultaneous measurement all the disadvantages inherent in the basic systems prevail or are even increased. Thus the operational range is considerably reduced since the light energy has to be divided into two halves due to the beam splitting required. The specification of the DT-OS No. 1548480 discloses an alignment device which employs a laser light source and substitutes the visual evaluation of the measuring results by light-electric means. The laser beam impinges upon a photocell constituted of four quadrants. Each deviation of the laser beam off the center of the quadrant array produces a variation of the photo current in the individual cells. The size of the variation is a measure of the misalignment. When in one cell of the photodetector the current increases the current in the oppositely located cell decreases. Therefore these cells are connected to a differentiator to simplify the electronic circuitry. Similar to the devices in the specifications DT-AS No. 2000828, DT-OS 1911956 and GB No. 1178007 the departure of a light bundle is evaluated in the specification DT-OS No. 2208004. Here the photo-electric elements are connected in a bridge circuit, its operation, however, does not differ from that of the aforementioned differentiator.

All the previous electronic circuits for evaluation are only a substitution of the conventional visual determination of the alignment and sighting measurements. They do not involve any change of the principle underlying the measuring device.

It is an object of the present invention to obviate the above disadvantages.

It is a further object of the present invention to provide a simple optical construction which permits a rapid and simultaneous measurement in at least two coordinate directions.

It is still a further object of the present invention to provide an alignment and sighting device which permits long distance precision measurements.

It is a still further object of the present invention to substitute an electronic evaluation for the previous optical one.

These and other objects are realised by a device for simultaneous alignment and sighting operations comprising a light source for emitting a light beam focused for infinity, a measuring unit including an alignment system, a beam splitter arranged in the path of the light beam of the alignment system, said beam splitter splits a portion from said light beam to yield a second light beam, and a first photo-electric transducer unit constituted of photo-cells which are photo-electrically insulated from each other and which are arranged in the plane of the photo-electric transducer unit and further comprising an electronic alignment evaluation unit including second difference amplifiers arranged subsequent to said first photo-electric element, characterised in that a second photo-electric transducer unit identical to the first one is provided in the measuring plane of the second light beam.

Identically located photocells of the two photo-electric transducer unit in the two planes of the photo-electric transducer units are connected to a unit of first difference amplifiers via electric connections established between the photocells and the first difference amplifier inputs.

Furthermore, an electronic evaluation unit including third difference amplifiers is provided for evaluating any departures from a desired direction, the inputs of said third amplifiers are electrically connected to the outputs of the first difference amplifiers.

The evaluation units which include the second and third difference amplifiers are of identical circuitry. The second difference amplifier inputs are connected to photocells in diametral opposition, respectively, to those first difference amplifiers inputs which are connected to the photocells of both photo-electric elements in diametral opposition.

Advantageously, the first difference amplifier unit involves an amplification control means for balancing the information channels or for calibrating the measuring value display unit. It is a further advantage when the photo-electric elements are constituted of four cells in the form of quadrants. Annular apertures are arranged before each photocell. In a preferable embodiment of the invention the alignment device is a telescope, in the image plan of which the first photo-electric elements are arranged and in the second light beam derived by splitting, the second photo-electric elements are located outside of the image plane of the optical system relevant for the respective path of the light beam.

In the focal plane of the telescope objective a hole aperture is arranged.

In a further preferable embodiment doing without optical lenses the photo-electric elements are arranged in the light beam in an optically shorter distance behind the entrance pupil of the measuring device than in the light beam derived by splitting.

The light beam which is focused for infinity advantageously consists of a laser beam the cross-section of which is spread by optical means.

The main advantage of the invention consists in a rapid and accurate production of the measuring values in two coordinate directions both for alignment and sighting with a simple and compact optical construction and comparatively low costs for electronics. The measuring result can be visualized or recorded for later evaluation and utilization.

The use of a spread laser beam involves the advantage in cooperation with an annular aperture in front of the photocells that the photocells are located in those portions of the light beams having the greatest brightness variations, which ensures a high measuring sensitivity. The setting of the object to be measured and of the measuring device does not require any complicated adjustment operations. As soon as the light beam is captured by the measuring device (immediately after zero-setting) the alignment and or sighting operation can start.

Figure 2:
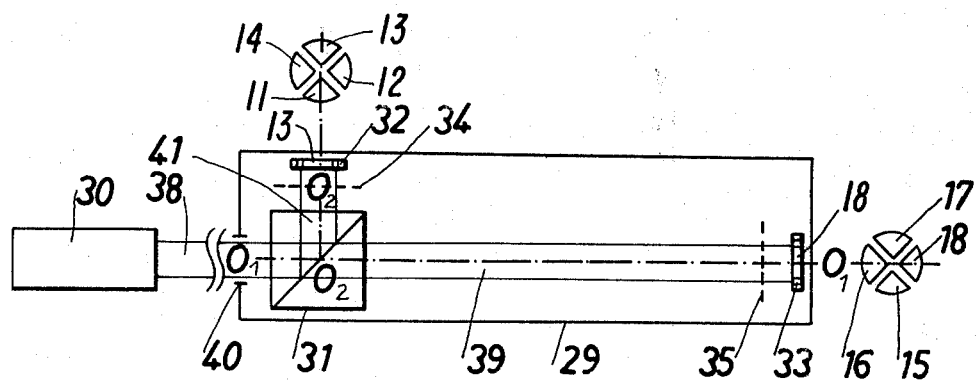

In order that the invention may be more readily understood reference is made to the accompanying drawings which illustrate diagrammatically and by way of example two embodiments thereof and in which:

FIG. 1 shows a schematical representation of the optical and electronic components of the inventional alignment and sighting device, and FIG. 2 is an embodiment of the optical system of the device as shown in FIG. 1.

The entire device for performing alignment and sighting measurements consists of a not shown light source emitting a bundle of parallel light 38 and a measuring device for deriving the measuring values. The measuring device is constituted of an optical part and an electronic evaluation unit.

In FIG. 1, in a housing 1 of the optical part a telescope system for alignment operation is shown which comprises about an optical axis $O_1$—$O_1$ an objective 2, a splitting cube 7, an aperture 3, an eyepiece 4, an annular aperture 5 and a light electric transducer unit 6. The light beam 38 which enters the telescope system substantially in parallel to the axis $O_1$—$O_1$ is split in the splitting cube 7 into a light beam 36 which runs, when adjusted, coaxially to the axis $O_1$—$O_1$, and into a light beam 37, which follows an optical axis $O_2$—$O_2$ which, in turn, is at right angles to the optical axis $O_1$—$O_1$. An aperture 8, an annular aperture 9 and a light electric transducer unit 10 are arranged in the light beam 37.

In operation, at first the measuring device is adjusted. This is achieved in aligning the optical axis $O_1$—$O_1$ to an optical axis (not shown) of the bundle of parallel light 38. The telescope is constructed in such a manner that the object plane is adjacent to a light entrance opening 40 of the optical part and the light electric transducer unit 6 lies in the corresponding image plane. The object plane is defined as a plane in the bundle of parallel light which (the optical system) images into the image plane.

The light electric transducer unit 6 defines the measuring plane.

A tilting of the measuring device 1 about its entrance opening 40 has no effect upon the transducer unit 6. Said unit 6 only detects misalignments. The annular aperture 5 located directly before the transducer unit 6 ensures a high measuring sensitivity since it is provided in the range of the highest degree of light intensity variation of the light bundle. Already inferior misalignments cause a considerable variation of the photo current in the transducer unit 6 provided that the intensity distribution varies along the radius of the bundle of light, as it is the case with a laser beam.

It is advantageous when a spread laser beam is employed which permits an increased directional stability so that a wide measuring range can be covered at a low divergency of the light beam and without any change of the illumination relations at the photo-electric transducer unit 6. The hole aperture 3 located in the focal plane of the objective 2 and also the hole aperture 8 in the light beam 37 eliminate any stray light effects. The photo-electric transducer unit 10 is arranged behind the focal plane considered in the direction of light propagation but not in the image plane. The measuring plane is so selected that the diameter of the light beam 37 corresponds to that of the measuring plane, defined by the photo-electric transducer unit 6 in the light beam 36.

This involves the additional advantage that both transducer unit 6 and 10 are identically constructed and hence have identical dimensions. The object plane which is optically conjugate to the plane defined by the transducer unit 10 lies considerably in front of the entrance opening 40 of the measuring device. Said assumed object plane is imaged onto the transducer unit 10. So the light beam 37 moves out of the center of the transducer unit 10 both, when deviations from alignment and/or from a true direction (sighting) occur in the measuring device.

The transducer units 6 and 10 consist of photo-cells in an array in the transducer plane. The transducer unit 6 comprises photocells 11, 12, 13, 14 arranged in quadrants. In analogy thereto the transducer unit 10 is constituted of photocells 15, 16, 17, 18. Such a division into quadrants permits an exact position definition of the light beams in the measuring plane. The transducer plane and the measuring plane are similar.

When, for example, the light beam 36, moves to the top of the transducer unit 6, then the photo-current increases in the photocells 12, whereas it decreases in the photocell 14. The evaluation of misalignments and the conversion of the measuring values into respective electric signals is carried out in an electronic evaluation circuit 19' including second difference amplifiers 20 and 21.

The second difference amplifier 20 produces an electric output signal when a deviation from alignment in y-direction occurs. To this purpose amplifier 20 inputs are connected to the photocells 12 and 14. The output signal y is zero when the photo currents of the cells 12 and 14 are balanced. Each deviation from the balanced state either in direction of the photocell 12 or 14 results in either a positive or negative output signal y. Deviations from alignment in x-direction are evaluated, in analogy to those in y-directions, from the photocurrents in the photo-cells 11 and 13. The second difference amplifier 21 produces a corresponding output signal x. The light beam 37 departs from a central position on the photo-electric transducer unit 10 both, at directional and/or alignment deviations of the measuring device.

Each variation of the photo-currents in the photocells 15, 16, 17, 18 is composed of a variation resulting from direction deviations and a misalignment. Since, measuring results derived from deviations from the aligned state are already obtained, it is feasible to separate the summands by difference operations of the photo signals derived from those photocells of the transducer units 6 and 10 which occupy like positions in the respective measuring plane. To this purpose first difference amplifiers 22, 23, 24, 25 are provided in the electronic evaluation unit 19, and, subsequent thereto, a further evaluation unit 26 including third difference amplifiers 27, 28.

The first difference amplifier 22 is connected to the photocells 11 and 16, and the output signal of the first difference amplifier 22 corresponds to directional deviations of the measuring device in a negative direction. The analog positive signal is produced through the first difference amplifier 23 out of the signals of the photocells 13 and 18.

It is a condition for a correct difference formation that the signals from the transducer unit 6 are of the same size as those signals from the transducer unit 10 and as the sum portions derived from the misalignments. When required the positive and the negative inputs of the difference amplifiers are rated by a factor so that signal balance is obtained. The output signals from the first different amplifiers 22 and 23 only contain information about directional deviations of the measuring device from a desired direction (sighting operation). When there is coincidence between the telescope axis $O_1$—$O_1$ of the measuring device and the light beam 36 axis, both output signals are of the same size. A parallel displacement between the telescope axis $O_1$—$O_1$ and the light beam 36 is without any effect. Only when the two axes $O_1$-$O_2$ and the axis of the light beam 36 enclose an angle, the $\gamma$ component of this angle affects the output of the first difference amplifiers 22 and 23. Depending on the direction of the angle the one signal will increase and the other signal will decrease, and vice versa. The direction signal $\gamma$ is obtained by a difference operation in a third difference amplifier 28.

To this end the outputs of the first difference amplifiers 22 and 23 are connected to the inputs of the third difference amplifier 28.

In order to obtain the $\xi$-component of a directional deviation the photocells 12 and 17 are connected to the first difference amplifier 25 and the photocells 14 and 15 to the first difference amplifier 24. The direction signal $\xi$ is then obtained through difference operations in the third difference amplifier 27. The third difference amplifiers 27 and 28 represent the evaluation logic 26.

FIG. 2 shows an embodiment of an optical part 29 of the alignment and sighting device, which does not employ optical lens components. The light source is again a laser 30 emitting a beam of parallel light 38, the diameter of the beam is matched to the photoelectric detectors. The light source 30 can be rigidly mounted to the object to be measured and, in some distance therefrom, the measuring device 29 is arranged about the sighting line. The measuring device 29 and the light source 30 can mutially exchange their positions. The measuring device 29 includes a beam splitter 31, photo-electric transducer units 32 and 33, and annular apertures 34 and 35. Adjacent to an entrance opening 40 of the measuring device 29 the beam splitter 31 is located in the light beam 38 to split the latter into a partial light beam 41 to impinge upon the transducer unit 32 and into a partial beam 39 to impinge upon the transducer unit 33. Providing that there is only a short distance between the entrance opening 40 and the transducer unit 32, a tilting of the measuring device 29 does only deflect the light bundle 41 at a small degree from its centrally adjusted position relative to the transducer unit 32. In contrast thereto, a misalignment will become fully effective.

The transducer unit 32 serves to determine any misalignments. The transducer unit 33 is located in the light beam 39 in a greater distance from the entrance opening 40 of the measuring device 29, compared to the distance between the entrance opening 40 and the transducer unit 32. Such a greater distance ensures that any directional deviations will yield remarkable results. The output signal again consists of a directional component and an alignment component, since misalignments are just as effective as with the transducer unit 32.

Thus the same situation as in FIG. 1 prevails and the measuring values obtained from the directional and alignment deviations can now be computed by the same electronic circuitry as in FIG. 1, provided that the photo-electric transducer units 32 and 33 consist of four photocells each in quadrant arrangement. The annular apertures 34 and 35 are arranged in the range of the extremest intensity variations of the light beams 39 and 41, respectively, before the transducer units 32 and 33, respectively.

The transducer units 6 and 10 of FIG. 1 and 32, 22, of FIG. 2 can be photocells in which the sensitivity is locally dependent along a straight line.

I claim:

1. Device for simultaneously performing alignment and sighting operations, comprising
   a light source for emitting a bundle of parallel light being focused for infinity,
   a measuring device, said light source and said measuring device being located remote from each other,
   said measuring device located in an elongated housing having a light entrance opening in the front face comprising,
   a first optical axis being at right angles to the light entrance opening, a second optical axis being at right angles to said first optical axis adjacent said light entrance opening, a beam splitter being arranged about said first and said second optical axis, said light entrance opening being for directing said bundle of parallel light into said housing, said beam splitter splitting said bundle of parallel light into a first light beam and into a second light beam, said second light beam being at right angles to said first light beam, a first photo electric transducer unit being arranged in a plane at right angles to the first optical axis, remote from said light entrance opening, said first photoelectric transducer unit being for alignment measurements, a second photoelectric transducer unit being arranged in a plane at right angles to said second optical axis, said first and said second photoelectric transducer units being identically constituted of four photocells each in a quadrant array, an optical system arranged about the first optical axis for imaging the entrance opening onto the first photo electric transducer unit, electronic evaluation unit comprising first, second, and third difference amplifiers, said first, second and third difference amplifiers being provided with first and second inputs each, and with one output each, said first inputs of said first difference amplifiers and said second inputs of said first difference amplifiers being connected to said first and said second photo electric transducer units in such a manner that those photocells being arranged at the place of departure of the first and second light beam from said first, respectively, second optical axis are connected to a common one of said first difference amplifiers, said second inputs of said first difference amplifiers being further connected to said first and said second inputs, respectively, of said second difference amplifiers, the first and second inputs, respectively, of said third difference amplifiers being connected to the outputs of said first difference amplifiers in such a manner that the photocells of said second photoelectric transducer unit, being in diametrical opposition, are connected for direction evaluation, said first and said second inputs, respectively, of said second difference amplifiers and said second inputs of said first difference amplifiers being connected in such a manner to the photocells of said first photoelectric transducer unit that the photocells in diametrical opposition are connected for alignment evaluation.

2. Device for simultaneously performing alignment and sighting operations, comprising a light source for emitting a bundle of parallel light, a measuring device, said light source and said measuring device being located remote from each other, said measuring device comprising in an elongated housing being provided with a light entrance opening in the front face a first optical axis being substantially at right angles to the light entrance opening, a second optical axis being at right angles to said first optical axis adjacent said light entrance opening, a beam splitter being arranged about said first and said second optical axis, said light entrance opening being for directing said bundle of parallel light into said housing, said beam splitter splitting said bundle of parallel light into a first light beam and into a second light beam, said second light beam being at right angles to said first light beam, a first photoelectric transducer being arranged in a plane at right angles to the second optical axis adjacent said beam splitter, said first photoelectric transducer being for alignment measurements, a second photoelectric transducer unit being arranged in a plane at right angles to said first optical axis, remote from said light entrance opening, said first and said second photoelectric transducer units being identically constituted of four photocells each in a quadrant array, and an electronic evaluation unit comprising first, second and third difference amplifiers, said first, second and third difference amplifiers being provided with first and second inputs each, and with one output each, said first inputs of said first difference amplifiers and said second inputs of said first difference amplifiers being connected to said first and said second photoelectric transducer units in such a manner that those photocells being arranged at the place of departure of the first and second light beam from said first, respectively, second optical axis are connected to a common one of said first difference amplifiers, said second inputs of said first difference amplifiers being further connected to said first and said second inputs, respectively, of said second difference amplifiers, the first and second inputs of said third difference amplifiers being connected to the outputs of said first difference amplifiers in such a manner that the photocells of said second photo-electric transducer unit, being in diametrical opposition, are connected for direction evaluation, said first and said second inputs, respectively, of said second difference amplifiers and said second inputs of said first difference amplifiers being connected in such a manner to the photocells of said first photoelectric transducer unit that the photocells in diametrical opposition are connected for alignment evaluation.

* * * * *